(12) United States Patent
Barsness et al.

(10) Patent No.: US 7,305,629 B2
(45) Date of Patent: Dec. 4, 2007

(54) CONSOLIDATION OF COMPUTER DOCUMENTATION

(75) Inventors: Eric Lawrence Barsness, Pine Island, MN (US); Richard Dean Dettinger, Rochester, MN (US); Brian Edward Olson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 10/255,917

(22) Filed: Sep. 26, 2002

(65) Prior Publication Data

US 2004/0061719 A1   Apr. 1, 2004

(51) Int. Cl.
G06F 3/00 (2006.01)
(52) U.S. Cl. .................. 715/788; 715/512; 715/515
(58) Field of Classification Search ............... 345/788; 715/788
See application file for complete search history.

(56) References Cited

U.S. PATENT DOCUMENTS

| | | | | |
|---|---|---|---|---|
| 6,240,410 | B1 * | 5/2001 | Wical | 707/4 |
| 6,792,595 | B1 * | 9/2004 | Storistenau et al. | 717/110 |
| 2002/0147735 | A1 * | 10/2002 | Nir | 707/200 |
| 2003/0037312 | A1 * | 2/2003 | Czech | 717/120 |

FOREIGN PATENT DOCUMENTS

EP   1 100 008   *   5/2001

OTHER PUBLICATIONS

Sun Microsystems, Javadoc Tool Home Page, Aug. 16, 2001, Internet: http://java.sun.com/.*
MySQL, Download APIs, Jun. 4, 2001, Internet: http://www.mysql.com/downloads.api.html.*

(Continued)

*Primary Examiner*—Kristine Kincaid
*Assistant Examiner*—Ryan Pitaro
(74) *Attorney, Agent, or Firm*—Wood, Herron & Evans, LLP (57) ABSTRACT

An apparatus, program product and method effectively merge computer documentation for multiple API sets together to facilitate user access to such computer documentation. Such merging of computer documentation may include, in part, the incorporation, into a navigation file, of a plurality of API set links associated with a plurality of API sets, as well as the incorporation, into an index file, of a plurality of index links to documentation files for at least two of the plurality of API sets. Furthermore, computer documentation may be displayed to a user by displaying selected information in a plurality of display regions of a computer display. In a first display region, at least a portion of a first navigation file may be displayed, with the first navigation file including a plurality of API set links associated with a plurality of API sets. In a second display region, at least a portion of a second navigation file associated with a selected API set among the plurality of API sets may be displayed, with the second navigation file including a plurality of program entity links associated with a plurality of program entities in the selected API set. In a third display region, at least a portion of an index file may be displayed, with the index file including a plurality of index links associated with documentation files for at least two API sets from the plurality of API sets.

40 Claims, 4 Drawing Sheets

OTHER PUBLICATIONS

Menalto.com, Gallery :: your photos on your website, Aug. 2, 2002, Internet: http://gallery.menalto.com.*

Sourceforge.net, JDiff—An HTML Report of API Differences, Dec. 3, 2001, Internet: http://javadiff.sourceforge.net/.* http://java.sun.com/j2se/javadoc/proposed-tags.html, "Proposed Javadoc Tags," pp. 1-3, printed May 29, 2002.

http://java.sun.com/j2se/1.4/docs/tooldocs/windows/javadoc.html, "javadoc—The Java API Documentation Generator," pp. 1-20, printed May 29, 2002.

http://cvs.sourceforge.net/cgi-bin/viewcvs.cgi/~checkout~/javadiff/jdiff/jdiff.html, "JDiff User Documentation," pp. 1-12, printed Aug. 21, 2002.

* cited by examiner

CONSOLIDATION OF COMPUTER DOCUMENTATION

FIELD OF THE INVENTION

The invention relates to computers and computer software, and in particular, to displaying computer documentation on a computer.

BACKGROUND OF THE INVENTION

As computers and computer technology become more complex, a continuing need exists for documentation to assist programmers, service personnel, and other users in understanding various computer technologies. Computer documentation may include practically any information about the hardware and/or software of a computer.

For example, one predominant use of computer documentation is in the area of documenting computer programming languages. Both the underlying language syntax, and programs written in a particular language, often need to be documented to assist programmers in developing, debugging and using various computer programs written in a particular language. Furthermore, the increasingly-common practice of reusing pre-existing program code in new computer programs has necessitated that much of the program code being developed today be well documented for the benefit of other computer programmers. Advancements in object-oriented technology, for example, have enabled computer programmers to assemble complex computer programs using a multitude of pre-existing software components, which often minimizes the amount of custom code that needs to be generated by a programmer to interface the pre-existing components together. Countless hours and expenses that would otherwise be required to develop a program from scratch can be saved through the use of reusable software components.

Before a reusable component can be incorporated into a particular computer application, however, a programmer is required to understand the various operations and data supported by that component. Access to documentation about the capabilities and limitations of reusable components is therefore often a key to a programmer's ability to efficiently incorporate reusable components in a computer application.

Early attempts at documenting computer software were often limited to the insertion of text comments into the actual source code for a particular program or program component. For more complex projects, documentation could be generated manually by the developer or by another individual as a separate document from the source code. In many instances, the generation of documentation for a computer program required nearly as much effort as the development of the program itself.

Later, document generation tools were developed to assist programmers in automatically generating documentation for computer programs and components developed by those programmers. For example, for the Java program environment, a document generation tool known as Javadoc was developed to automatically generate documentation files for Java program entities such as classes and the like.

Using the Javadoc tool, programmers are permitted to insert markup tags in source code using well-defined conventions. Then, by passing the annotated or marked up source code through the Javadoc tool, a set of standardized documentation files may be generated. Moreover, the documentation files generated by the Javadoc tool are typically arranged into a well-accepted directory format containing, in addition to the generated documentation files, a number of standardized files used to provide a consistent look and feel to a user viewing the documentation files. Additional value-added features, such as alphabetical indices, version information, class hierarchy information, class-use information, and table of content information are also automatically generated by the Javadoc tool.

Consistent with the Java programming language, program code is often organized into classes, which are used as templates to instantiate Java-compatible objects. Classes are typically organized into packages with other related classes. Moreover, related packages are typically collected together to form collections commonly referred to as Application Programming Interface (API) sets.

The Javadoc tool typically generates documentation files grouped by class, package, and ultimately under a single API set. Supplemental material such as index files, class hierarchy tree files, overview files, class-use files, etc. are generated from all of the program code collected under a given API set.

Moreover, while other file formats are supported, Javadoc documentation files are typically formatted in Hypertext Markup Language (HTML), with hypertext links embedded in the files to permit a user to jump from documentation file to documentation file in a fast and intuitive manner. Also, by generating documentation files in this manner, users are able to view the documentation files using a conventional HTML-compatible web browser.

In many instances, the Javadoc tool generates a collection of HTML files that are displayed in a plurality of panes or frames, and that function as navigation files to assist a user in jumping between various packages and classes collected under a given API set. Typically, a main frame is displayed at the right side of a window and is used to display most of the relevant documentation information. To the left of the main frame are two navigation frames, including a package navigation frame stacked on top of a class navigation frame. The package navigation frame displays a package navigation file including a plurality of package links that identify each package in the API set. The class navigation frame displays a class navigation file including a plurality of class links identifying each class in a given package. Thus, through selection of a particular package link in the package navigation file, the class navigation frame is updated to display a list of classes included in the selected package. Then, by selecting a class link from the class navigation frame, documentation associated with the selected class is displayed in the main frame of the window.

While the conventional Javadoc layout substantially simplifies user access to Java-related documentation, a problem still exists due to the fact that many programmers rely on a number of different API sets when constructing Java-compatible programs. For example, a typical Java developer may need the documentation for the core Java Developer Kit (JDK) API set, several optional packages, an XML parser, an API built on top of the XML parser, and any relevant build tool. Typically, however, the documentation for all of these API sets is separately generated and stored by the Javadoc tool, so a user is left to manually find and access the documentation for a given API set.

Moreover, with the rise of open source and enterprise frameworks, programmers are often required to interface with more and more code pieces that they did not originally write, making the ability to quickly find the documentation for these API sets even more cumbersome. While Javadoc-generated documentation files exist for many of these API sets, however, there is no structured manner for collecting the documentation for multiple APIs in one organized and usable accessible system.

Some programmers may attempt to remedy this problem individually by creating a personal portal web page, or by creating bookmarks that may be used to open up the documentation files for specific API sets. However, as discussed above, one of the advantages of Javadoc is the degree of cross-referencing and indexing that takes place during the generation of documentation files. With no integration of documentation files from multiple API sets, the index files, the class-use files, class hierarchy files, etc. do not span multiple API sets, so if a user is attempting to find documentation regarding a particular program entity, but that user is unsure of which API set that entity resides within, the user is left to manually search the documentation files for multiple API sets to attempt to find the relevant information.

Therefore, a significant need exists in the art for a manner of better organizing the documentation files for multiple API sets.

SUMMARY OF THE INVENTION

The invention addresses these and other problems associated with the prior art by providing an apparatus, program product and method in which computer documentation for multiple API sets is effectively merged to facilitate user access to such computer documentation. Such merging of computer documentation may include, in part, the incorporation, into a navigation file, of a plurality of API set links associated with a plurality of API sets, as well as the incorporation, into an index file, of a plurality of index links to documentation files for at least two of the plurality of API sets.

In addition, in some embodiments, computer documentation may be displayed to a user in a manner consistent with the invention by displaying selected information in a plurality of display regions of a computer display. In a first display region, at least a portion of a first navigation file may be displayed, with the first navigation file including a plurality of API set links associated with a plurality of API sets. In a second display region, at least a portion of a second navigation file associated with a selected API set among the plurality of API sets may be displayed, with the second navigation file including a plurality of program entity links associated with a plurality of program entities in the selected API set. In a third display region, at least a portion of an index file may be displayed, with the index file including a plurality of index links associated with documentation files for at least two API sets from the plurality of API sets.

In one specific application of the invention, for example, computer documentation files generated for individual API sets in the general manner of a conventional Javadoc document generation tool may be effectively merged together utilizing the basic framework utilized by a conventional Javadoc environment to support user access to the documentation files for multiple API sets. Moreover, a supplemental API set navigation file may be displayed to a user in a API set navigation frame concurrently with the display of package and class navigation frames, thereby initiating the display of API set-specific package and/or class navigation files responsive to selection of different API sets in an API set navigation frame. Moreover, index and/or class-use information may be merged for multiple API sets such that global, multi-API set index and class-use information is available to the user. It will be appreciated, however, that the invention is not limited to application solely in a conventional Javadoc environment.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter effectively merge computer documentation for multiple API sets usable within a program development environment to facilitate user access to such computer documentation. The computer documentation may include practically any relevant information about a programming environment, including, for example, object descriptions, class descriptions, variable descriptions, method descriptions, package descriptions, API descriptions, example code, setup/configuration information, etc., as well as descriptions of various other types of program elements or entities. Moreover, the computer documentation may include derived information such as index information, use information, cross-reference information, version information, etc. Moreover, an API set may be considered to include practically any collection of computer program entities suitable for integration into or use by other programs, e.g., in the Java environment, various Java-compatible technologies such as released APIs, development kits, language extensions, tools, etc.

Various manners of collecting and organizing computer documentation may be used. For example, computer documentation will hereinafter be referred to as being organized into one or more files, and it should be understood that a file may represent practically any organizational structure utilized in a computer environment, e.g., a record, a page, a document, etc. Furthermore, computer documentation files may be encoded using various protocols, including various markup languages such as HTML and XML, as well as other formats including ASCII, PDF, EBCDIC, Word, UTF-8, etc. Documentation may be in the form of text, and may include other audio and/or visual content including pictures, graphics, animations, sounds, videos, etc. Moreover, documentation files typically include links to other documentation files, e.g., via HTML or XML compatible hypertext links. Other manners of navigating between multiple documents, however, may be used in the alternative.

Hardware/Software Environment

Figure 1:
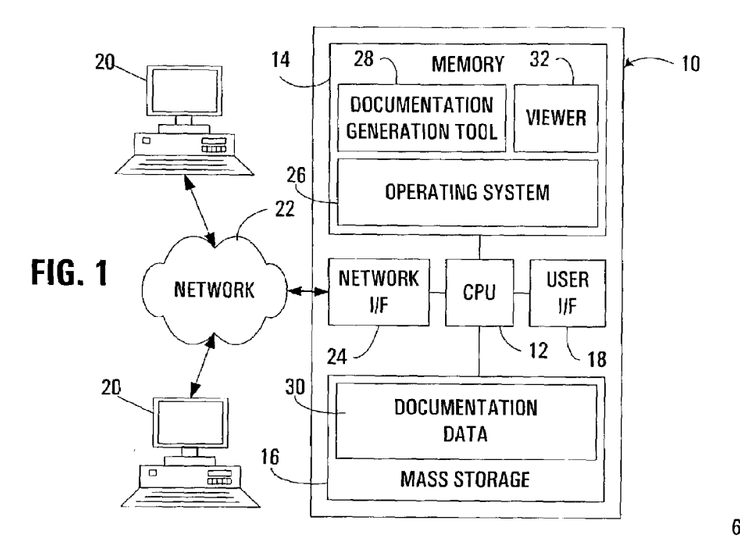
FIG. 1 is a block diagram of a networked computer system incorporating a documentation generation tool consistent with the invention.

Turning now to the Drawings, wherein like numbers denote like parts throughout the several views, FIG. 1 illustrates an exemplary hardware and software environment for an apparatus 10 suitable for implementing a documentation generation tool consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. (e.g., a documentation generation tool 28 and a viewer 32 shown resident in memory 14, and documentation data 30 shown resident in mass storage 16, among others). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Consolidated Display of Javadoc API Set Documentation

The embodiments discussed hereinafter focus on a specific application of the invention within the context of a Javadoc environment, whereby a Javadoc documentation generation tool is used to generate documentation files for Java program entities such as packages, classes, methods, variables, interfaces, exceptions, etc. It will be appreciated, however, that the invention may be utilized in connection with documentation generated for other environments (e.g., for c# API documentation), and even for organizing documentation for multiple environments (e.g., a combined repository for Java and c# API documentation). The invention is therefore not limited to the specific implementation discussed herein.

Given this specific Java-compatible implementation, in the computer of FIG. 1, documentation generation tool 28 may be considered to be an enhanced Javadoc tool, documentation data 30 may be considered to be a collection of HTML web pages, and viewer 32 may be considered to be a conventional HTML-compatible web browser.

It may be appreciated, however, that the functionality of documentation generation tool 28 in creating documentation for an API set and in organizing documentation from multiple API sets may reside in different programs. For example, a conventional Javadoc tool may be used to generate individual API set documentation files, while a separate organization tool may be used to organize those API sets in an enhanced facility as described herein. Furthermore, it should be appreciated that in some circumstances, e.g., where a user is collecting API sets that were not originally generated by that user, an organization tool resident on that user's computer may not include any functionality for generating the documentation for an API set. Some of the functionality may also be accessed via a downloadable applet, an embedded script, or another form of downloadable program code, whether or not embedded in a documentation file. Also, documentation data may be stored locally in a computer, or may be located remotely, e.g., on an Internet server.

As will become more apparent below, many of the features of the herein-described implementation relies on the underlying capabilities of a conventional Javadoc facility, and to this extent, the herein-described implementation may be referred to as an enhanced Javadoc facility. One primary difference between the enhanced Javadoc facility and a conventional facility is the addition of a supplemental "API set" navigation frame, which lists various complete API sets that have been installed to the enhanced Javadoc facility. Selecting one of these API sets updates a second frame, which provides a list of packages in a selected API set, and which is similar in many respects to the top left frame in a conventional Javadoc facility. Much of the rest of the navigation, such as selection of classes, indices, etc. is handled in a similar manner to a conventional Javadoc facility, e.g., via a third, class navigation frame.

As is well known in the art, at runtime, the documentation files generated by a conventional Javadoc facility are arranged into a collection of markup language encoded documents such as HTML files. In a conventional Javadoc environment, application programmers write comments as part of their source code, and use a handful of special symbols to serve as instructions to the Javadoc tool and tell it how to interpret the comments the programmer has written. Then the Javadoc tool is used to generate all the files for the documentation. The tool generates class detail files index files and navigation files. Everything has a well-defined place in the file system and a well-known structure. The herein-described implementation of the invention may leverage this existing functionality in building an enhanced navigation system and facility.

In the context of the invention, an API set may be considered to include a group of Application Programmer Interfaces that together make up a product, tool, or other software offering. For example, any specific release of the JDK (Java Developer Kit) may be an API set, as it ships as one group of functionality with the purpose of providing the system's core API. However, two different releases might be considered two API sets, as they do not ship together. In this context, a conventional Javadoc tool is designed to document an API set, whereas the enhanced tool discussed herein is designed to allow a developer to organize a collection of API sets together.

Under a conventional Javadoc implementation, generated documentation files are collected in a single "API" directory. An "index-files" directory is generated as a subdirectory of the API directory. In addition, packages within an API are represented by subdirectories under the API directory. In addition, a "class-use" subdirectory exists under every package subdirectory and serves as a cross-reference to where each particular class in a package is used throughout an API set. Within each package subdirectory are generated HTML documentation files providing the documentation specific to each class, interface, exception, etc. in the package, along with a frame file, summary file, tree file and use file for the package. Within the "class-use" subdirectory for a package are use files for each class, interface, exception, etc. for that package.

As an example, Table I illustrates the structured files for the "java.applet" package in the Java 2 Platform SE v.1.4.0:

TABLE I

| Java 2 Platform SE v.1.4.0 java.applet package file structure |
| --- |
| <root>\api\java\applet\Applet.AccessibleApplet.html |
| <root>\api\java\applet\Applet.html |
| <root>\api\java\applet\AppletContext.html |
| <root>\api\java\applet\AppletStub.html |
| <root>\api\java\applet\AudioClip.html |
| <root>\api\java\applet\package-frame.html |
| <root>\api\java\applet\package-summary.html |
| <root>\api\java\applet\package-tree.html |
| <root>\api\java\applet\package-use.html |
| <root>\api\java\applet\class-use\Applet.AccessibleApplet.html |
| <root>\api\java\applet\class-use\Applet.html |
| <root>\api\java\applet\class-use\AppletContext.html |
| <root>\api\java\applet\class-use\AppletStub.html |
| <root>\api\java\applet\class-use\AudioClip.html |

To support multiple API sets, the conventional Javadoc directory structure may be supplemented with another directory structure that assumes the job of containing information about all the different API sets on the system. This directory structure may be implemented by a root "global" directory that is in the same root directory as every other installed API directory. This global directory may include the following: (1) an index-files subdirectory, which is created by taking the index files from any Javadoc API set that is added to the system and merging them alphabetically with the current list of index entries, and (2) the package structure for all the classes and interfaces with subdirectories for class-use at the end of each. The files for the class-use may be generated in the same basic manner as a conventional Javadoc tool, but instead of only looking at a single API set, all the package structures for all the API sets may be scanned, providing a powerful mechanism for determining what might break throughout all the API's used if a given class is changed.

It may also be desirable to update all the normal Javadoc files for an API set to reference the new index files instead of the files that were generated when their API documentation was generated. In doing so, the original index files may remain untouched and with any links to the index in other documentation files just redirected to reference the new index files. The same operation may be performed for the class-use files. By simply updating the links to point to these global files, no modification of the existing API set-specific files is required. It may also be desirable so that, when the global index file entries are created, they are annotated with comments that allow the system to look at the file and know what package and release caused each entry to be added. This facilitates differentiation of the API sets that make up the global API list and makes it possible to easily find/remove them later.

In an alternative embodiment, XML documents may be used instead of comments in an index file. Such XML documents may contain all the data that makes up the index list so that removal, addition or switching of the display would simply require a transform over the document. Other manners of annotating a documentation file to identify and distinguish usages, indices, etc., may be used in the alternative.

Figure 2:
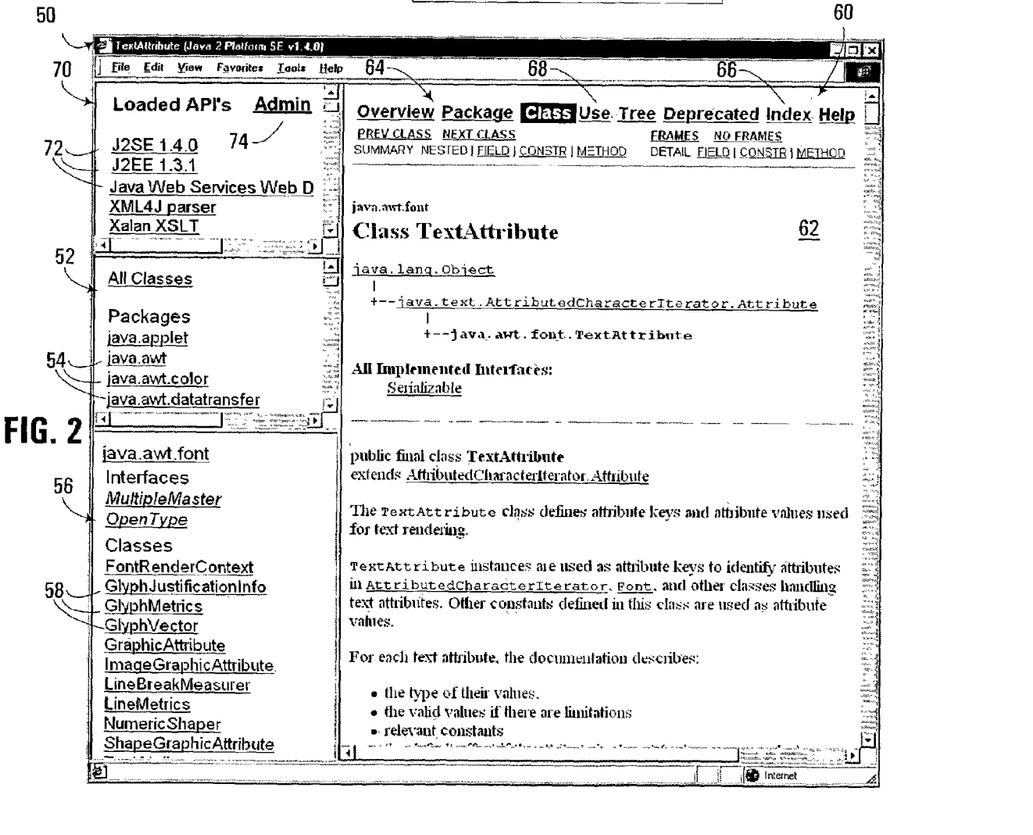
FIG. 2 is a block diagram of a viewer window displaying an exemplary documentation file generated by the documentation generation tool of FIG. 1.

To further illustrate the Javadoc-specific implementation of the invention, FIG. 2 illustrates an exemplary browser window 50 displaying a multi-pane or frame Javadoc-type interface consistent with the invention. A plurality of frames or panes are use to define separate display regions within the browser, and thus within a computer display. Similar to a conventional Javadoc display, browser 50 includes a package navigation frame 52 that displays a package navigation file including a plurality of links 54 identifying all of the packages within a given API set. Oriented below the package navigation frame is a class navigation frame 56, within which is displayed a class navigation file including a plurality of program entity or class links 58, identifying all of the classes and other program entities within a package specified by a user through selection of one of links 54 in package navigation frame 52.

On the right side of the display, a main frame 60 displays a documentation file 62 that provides documentation information regarding a class selected using one of links 58. As is consistent with the Javadoc standard, a toolbar 64 is encoded in file 62 including a plurality of links, including, among others, an index link 66 and a class-use link 68. Index link 66 typically references an index file, while use link 66 typically references a class-use file displaying usages of a particular class by other program entities in an API set. As will become more apparent below, however, in the illustrated implementation, links 66 and 68 reference global index and class-use files that provide index and class-use information spanning multiple API sets.

In addition, consistent with the invention, the conventional Javadoc layout is modified to include an additional navigation frame, an API set navigation frame 70, within which is displayed an API set navigation file including a plurality of API set links 72 identifying all of the API sets that have been added to the system. Of note, these API sets may be available from the same vendor, or may be available from multiple vendors. Furthermore, multiple versions or releases of a given API set may be represented in the list of links 72 provided in the API set navigation file displayed in frame 70.

Also added to navigation frame 70 is an administration link 74, which references an administration file from which API sets may be organized and managed, in a manner discussed hereinafter. Other manners of providing a link to an administration file, including display of an administration link in other frames in browser 50, may be used in the alternative. Moreover, other manners of initiating administration functionality, e.g., via a plug-in, menu selection or a separate tool, may also be used in the alternative.

It will be appreciated that the layout of frames 52, 56, 60 and 70 may vary in different implementations, therefore, the invention is not limited to the particular layout illustrated in FIG. 2. Moreover, it will be appreciated that the various frames displayed in browser 50 are typically encoded in HTML and are defined and laid out via a master HTML file or other style control such as a cascading style sheet. Other manners of encoding the various files displayed in browser 50 may be used in the alternative.

Figure 3:
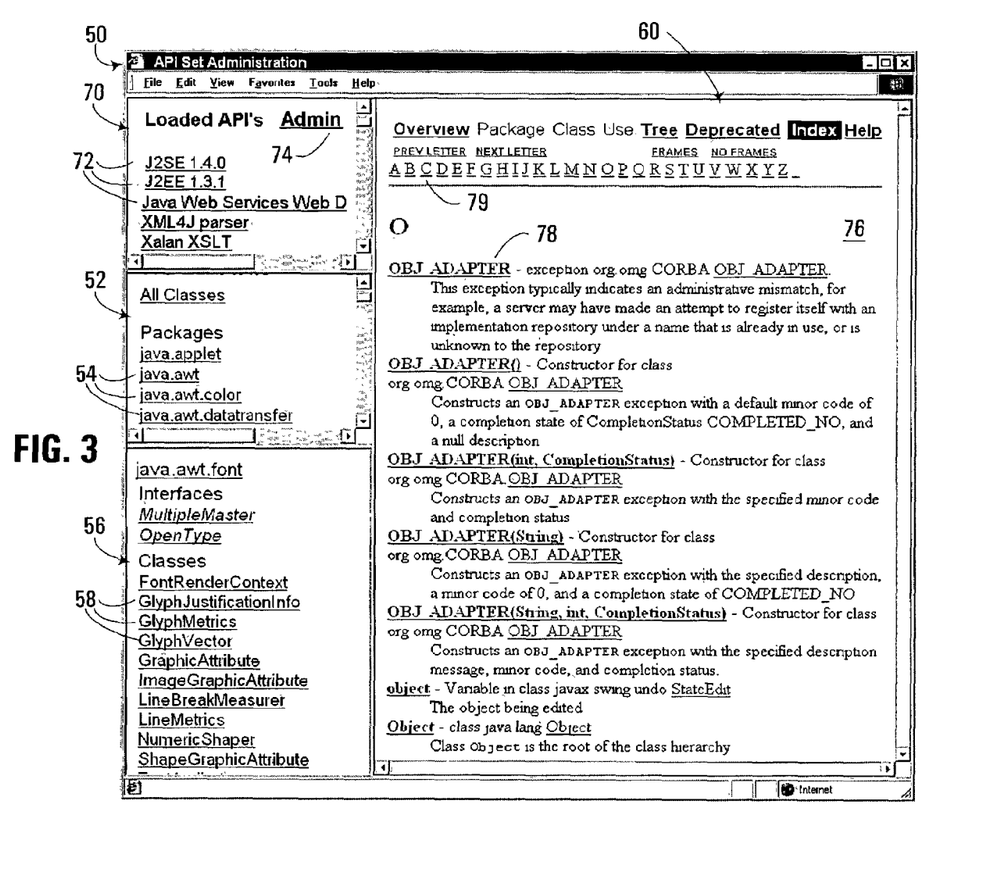
FIG. 3 is a block diagram of the viewer window of FIG. 2, subsequent to user selection of an index link to initiate the display of an index file.

FIG. 3 next illustrates an exemplary index file 76 displayed in main frame 60, e.g., in response to selection of index link 66 of FIG. 2. Index file 76 includes a plurality of index links 78, and consistent with the invention, this list of links is global from the perspective of multiple API sets. Put another way, index links associated with multiple API sets are merged together into index file 76 such that a global index is supplied to a user. Index file 76 as illustrated is for the letter "O," and it will be appreciated that additional index files are typically provided for the other letters of the alphabet, which may be selected via a series of alphabet links 79.

Figure 4:
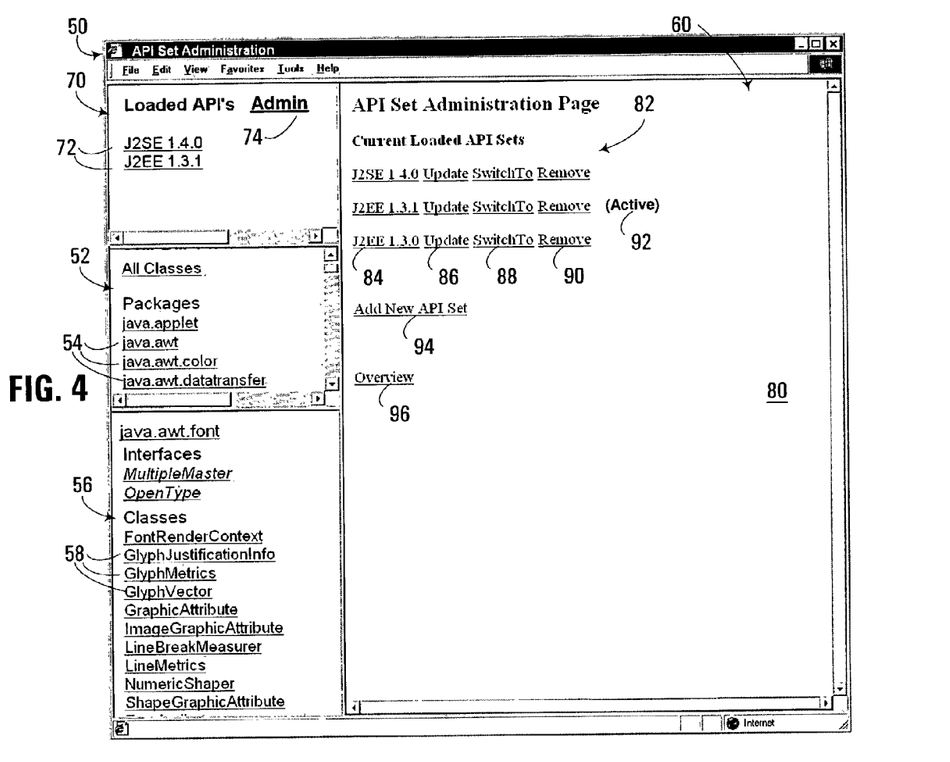
FIG. 4 is a block diagram of the viewer window of FIG. 2, subsequent to user selection of an administration link to initiate the display of an administration file.

To support administrative functionality consistent with the invention, an API set administration file may be displayed in main frame 60 in response to user selection of administration link 74. For example, FIG. 4 illustrates an exemplary API set administration file 80 displayed in main frame 60. Administration file 80, for example, may include a table 82 of currently-loaded API sets. For each currently-loaded API set, an identifier 84, which may also function as a link to the overview file for that API set, may be provided to identify that API set. Moreover, for each such API set, an update link 86, switch to link 88 and remove link 90 may be provided to initiate management functionality for the API set documentation. Update link 86, for example, may be used to remove an old version of an API set and replace that version with a new version of the API set. Switch to link 88 may be used to switch between different versions of an API set while maintaining both versions in the system. When more than two versions are loaded into the system, but only one is activated at any given time, an indicator 92 may be displayed to identify which of multiple versions of an API set is currently active. For example, as shown in FIG. 4, versions 1.3.0 and 1.3.1 of the Java 2 platform, enterprise edition, (J2EE) Java Developer Kit are displayed. As shown in FIG. 4, the 1.3.1 version is currently active, while version 1.3.0 in inactive.

Remove link 90 may be used to remove an API set from the system. To perform the converse operation of adding a new API set to the system, an add new API set link 94 may also be provided. Moreover, to support the navigation back to a main file for the Javadoc system, an overview link 96 may also be provided in file 80.

The various administration functions discussed herein may be implemented in a number of manners consistent with the invention. For example, the administration functions may initiate the execution of program code via scripts, execution of a Java applet, or other execution of local program code resident on the same computer as browser 50.

In other embodiments, implementation of such functionality may be resident on a remote computer such as a server. In still other embodiments, administration or organization of API sets may be performed by a tool separate from a browser. Therefore, the invention is not limited to the particular implementation discussed herein.

Figure 5:
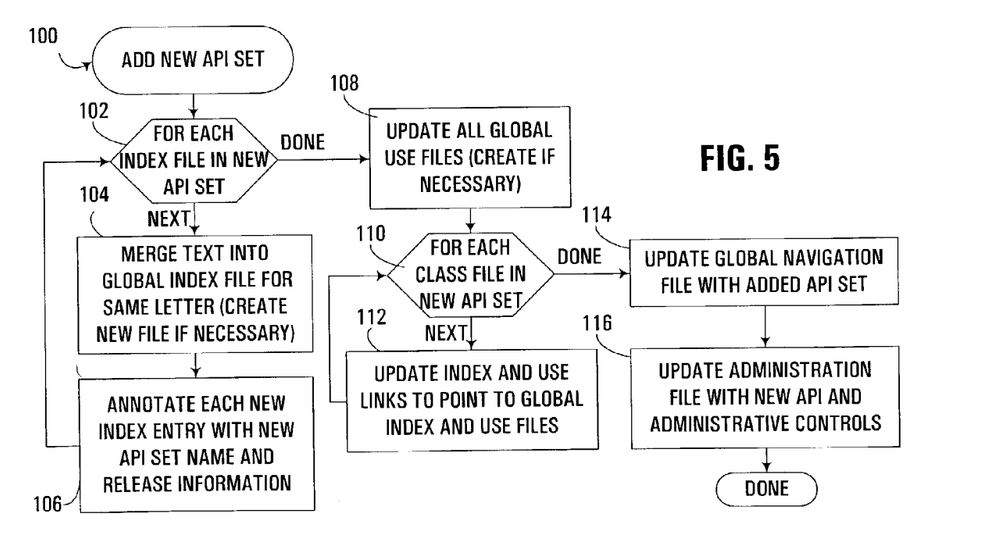
FIG. 5 is a flowchart illustrating the program flow of an add new API set routine capable of being executed by the documentation generation tool of FIG. 1.

FIGS. 5-8 next illustrate various routines that may be invoked in response to the selection of the administration links discussed above in connection with FIG. 4. FIG. 5, for example, illustrates an add new API set routine 100 that may be called to add a new API set to the herein-described enhanced Javadoc facility. Routine 100 begins in block 102 by initiating a loop to process each index file in the new API set. For each such index file, block 104 is executed to merge the text in the new index file into a global index file for the same letter of the alphabet. If no such global index file exists as of execution of block 104, such a global index file may be created as necessary. Next, in block 106, each new index entry that is merged into the global index file is annotated with the new API set name and any necessary release information, e.g., the version with which the index entry is associated. Annotation of each index entry may occur in a number of manners, including, for example, via a markup language tag, or via XML encoding. Block 106 then returns control to block 102 to process additional index files in the new API set.

Once each index file in the new API set has been merged into a global index file, block 102 passes control to block 108 to update all global use files, creating such files as necessary. The update of the global use files occurs in much the same manner as the global index files, specifically, for each class in the global set of API sets, each use of that class by other classes in the global set of API sets is identified, and a new use file is generated for that class in the same manner as a conventional Javadoc implementation. However, rather than being limited to usages within a given API set, the new global class-use files identify all uses across multiple API sets.

Next, block 110 initiates a loop to process each class file in the new API set. For each such file, block 112 updates the index and use links for that file to point to the global index and class-use files. It should be noted that, if the global index and use files are stored under the global subdirectory, updating the links merely accesses different sets of index and class-use files, but does not require that the original API set-specific index and class-use files be removed from the system. By doing so, removal of an API set is substantially simplified. In some implementations, it may also be desirable to support the access to API set-specific index and use files if desired, e.g., via the addition of supplemental links into the various documentation files to provide links to both the global and API set-specific index and class-use files. In addition, in some embodiments the index and use links in other documentation files may need to be updated in the same manner as discussed in connection with block 112.

Once the index and use links for each class file in the new API set have been updated, block 110 passes control to block 114 to update the API set navigation file to add a link to the new API set. Next, block 116 updates the administration file with links and administration controls for the new API set. Routine 100 is then complete.

Figure 6:
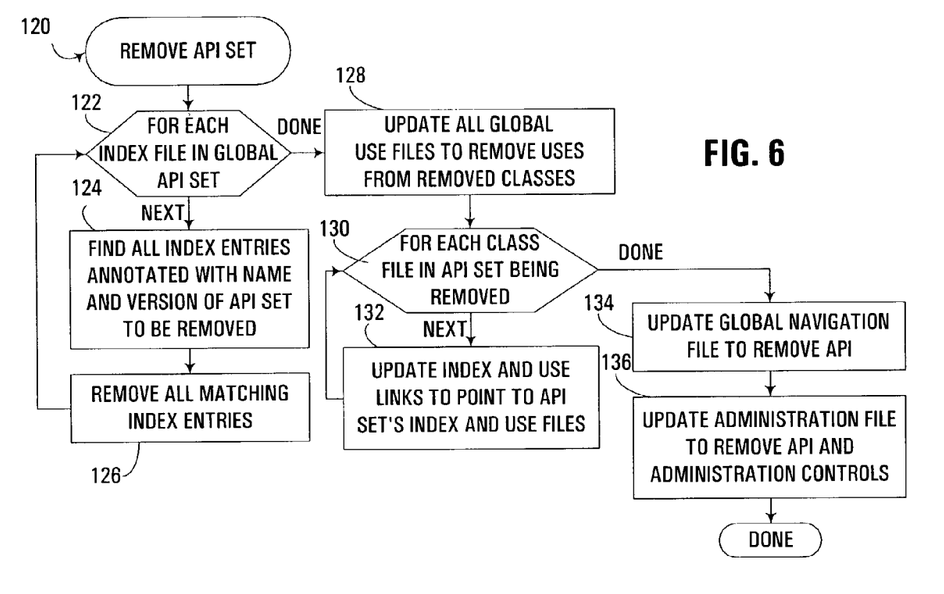
FIG. 6 is a flowchart illustrating the program flow of a remove API set routine capable of being executed by the computer documentation generation tool of FIG. 1.

Removal of an API set occurs in a complimentary manner to the addition of an API set. For example, FIG. 6 illustrates and exemplary remove API set routine 120 that begins in block 122 by initiating a loop to process each index file in the global API set. For each such file, block 124 is executed to find all index entries that are annotated with the name and version of the API set being removed. Block 126 then removes all matching index entries from the global index file and returns control to block 122. Once each index file in the global API set has been updated to strip away the index entries associated with the API set that is being removed, block 122 passes control to block 128 to update all global use files to remove uses from any removed classes. Control then passes to block 130 to initiate a loop to process each class file in the API set being removed. For each such class file, block 132 updates the index and use links to point to the API set-specific index and use files for that API set. Then, once each class file in the API set has been processed by block 132, block 130 passes control to block 134 to update the global navigation file to remove the link to the API set. Likewise, block 136 updates the administration file to remove the API link and administration controls for the removed API set. Routine 120 is then complete.

Figure 7:
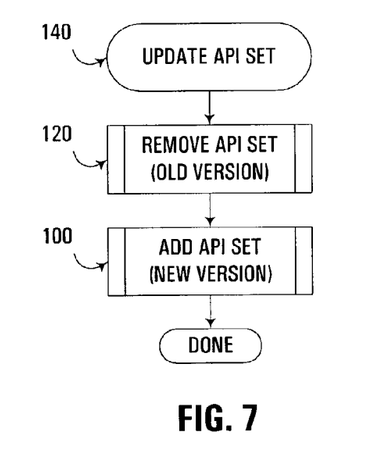
FIG. 7 is a flowchart illustrating the program flow of an update API set routine capable of being executed by the computer documentation generation tool of FIG. 1.

While updating of an API set may occur through the use of a unique routine, in the illustrated implementation, the update may incorporate simply the removal of an old version of an API set, followed by the addition of a new version of an API set. As such, FIG. 7 illustrates an exemplary update API set routine 140, which includes a call to the remove API set routine 120, providing as input thereto the identification of the old version of the API set, followed by a call to add API set routine 100, specifying as input thereto an identifier for the new version of the API set.

Figure 8:
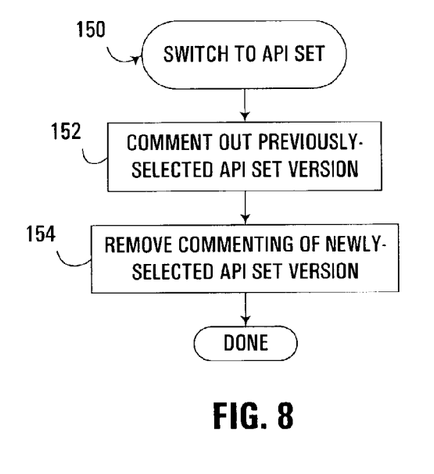
FIG. 8 is a flowchart illustrating the program flow of a switch to API set routine capable of being executed by the computer documentation generation tool of FIG. 1.

To switch between different versions of an API set, a routine such as routine 150 of FIG. 8 may be used. Routine 150 generally operates by selectively commenting out information associated with an inactive API set version such that the information is not displayed to a user, nor accessible via various hypertext links that have been inactivated via commenting out of such links. As such, routine 150 begins in block 152 by commenting out information associated with a previously-selected API set version. Thereafter, block 154 removes commenting from a newly-selected API set version, thus effectively activating that API set version on the system. Upon completion of block 154, routine 150 is complete.

It should be appreciated that, when multiple versions of a given API set are added, additional functionality may be desired to associate an added API set with one or more existing API sets that represent different versions of the same API set. By doing so, the association may be utilized to identify when to activate or inactivate certain API sets based upon user selection of others with which such API sets are associated.

It will be appreciated that alternative routines may be utilized to implement the functionality described herein. Therefore, the invention is not limited to the specific routines described herein.

Various modifications may be made to the illustrated embodiments without departing from the spirit and scope of the invention. Therefore, the invention lies in the claims hereinafter appended.

What is claimed is:

1. A computer-implemented method of displaying computer documentation, the method comprising:
 (a) displaying in a first display region of a computer display at least a portion of a first navigation file including a plurality of API set links associated with a plurality of Application Programming Interface (API) sets;
 (b) displaying in a second display region of the computer display at least a portion of a second navigation file associated with a selected API set among the plurality of API sets, the second navigation file including a plurality of program entity links associated with a plurality of program entities in the selected API set; and (c) displaying in a third display region of the computer display at least a portion of an index file that includes a plurality of index links associated with documentation files for at least two API sets from the plurality of API sets.

2. The method of claim 1, further comprising, in response to user input to select an index link from the index file, displaying on the computer display at least a portion of a documentation file associated with the selected index link.

3. The method of claim 1, further comprising, in response to user input to select a program entity link from the second navigation file, displaying on the computer display at least a portion of a documentation file associated with the selected program entity link.

4. The method of claim 1, wherein the second navigation file comprises a class navigation file and the plurality of program entity links are associated with a plurality of classes in the selected API set, the method further comprising displaying in a fourth display region of the computer display at least a portion of a package navigation file associated with the selected API set among the plurality of API sets, the package navigation file including a plurality of package links associated a plurality of packages in the selected API set, wherein the class navigation file includes a plurality of program entity links are associated with a plurality of classes in a selected package among the plurality of packages in the selected API set.

5. The method of claim 1, further comprising, in response to user input to select an administration link, displaying on the computer display at least a portion of an administration file, the administration file including an add API set link and a remove API set link.

6. The method of claim 1, wherein the first and second navigation files and the index file are encoded using a markup language.

7. A computer-implemented method of organizing computer documentation, the method comprising:
(a) incorporating into a navigation file a plurality of Application Programming Interface (API) set links associated with a plurality of API sets; and
(b) incorporating into an index file a plurality of index links to documentation files for at least two of the plurality of API sets.

8. The method of claim 7, further comprising:
(a) displaying at least a portion of the navigation file in a first display region of a computer display; and
(b) displaying at least a portion of the index file in a second display region of the computer display.

9. The method of claim 8, wherein the navigation file comprises a first navigation file, the method further comprising displaying in a third display region of the computer display at least a portion of a second navigation file associated with a selected API set among the plurality of API sets, the second navigation file including a plurality of program entity links associated with a plurality of program entities in the selected API set.

10. The method of claim 9, wherein the second navigation file comprises a class navigation file and the plurality of program entity links are associated with a plurality of classes in the selected API set, the method further comprising displaying in a fourth display region of the computer display at least a portion of a package navigation file associated with the selected API set among the plurality of API sets, the package navigation file including a plurality of package links associated a plurality of packages in the selected API set, wherein the class navigation file includes a plurality of program entity links are associated with a plurality of classes in a selected package among the plurality of packages in the selected API set.

11. The method of claim 9, further comprising, in response to user input to select a program entity link from the second navigation file, displaying on the computer display at least a portion of a documentation file associated with the selected program entity link.

12. The method of claim 8, further comprising, in response to user input to select an index link from the index file, displaying on the computer display at least a portion of a documentation file associated with the selected index link.

13. The method of claim 7, wherein incorporating the plurality of API set links into the navigation file includes, in response to user input to add a new API set, adding a new API set link for the new API set to an existing navigation file including a plurality of existing API set links associated with a plurality of existing API sets.

14. The method of claim 7, wherein incorporating the plurality of index links into the index file includes, in response to user input to add a new API set, merging a plurality of new index links associated with the new API set into an existing index file including a plurality of existing index links associated with a plurality of existing API sets.

15. The method of claim 14, wherein merging the plurality of new index links with the existing index file includes annotating the index file to indicate an association between each new index link and the new API set.

16. The method of claim 14, wherein the plurality of new index links are incorporated into a new index file associated with the new API set, the method further comprising, in response to user input to add the new API set, updating at least one documentation file associated with the new API set to redirect an index file link disposed therein from the new index file to the existing index file.

17. The method of claim 7, further comprising, in response to user input to add a new API set, generating at least one use file including a plurality of use links associated with uses of a selected program element, wherein the plurality of use links include links to uses of the selected program element in at least two API sets.

18. The method of claim 7, further comprising, in response to user input to remove an API set, removing an API set link associated with a removed API set from the navigation file, and removing at least one index link associated with the removed API set from the index file.

19. The method of claim 18, wherein removing at least one index link from the index file includes accessing an annotation in the index file that identifies the removed index link as being associated with the removed API set.

20. The method of claim 7, further comprising, in response to user input to switch between first and second versions of an API set, commenting out a first API set link associated with the first version of the API set from the navigation file, removing commenting in the navigation file for a second API set link associated with the second version of the API set, commenting out at least one index link associated with the first version of the API set from the index file, and removing commenting in the index file for at least one index link associated with the second version of the API set.

21. The method of claim 7, wherein the navigation file and the index file are encoded using a markup language and are configured to be displayed in a web browser.

22. The method of claim 21, wherein the markup language is selected from the group consisting of HTML and XML.

23. The method of claim 7, wherein the index file is associated with a letter of the alphabet, the method further comprising incorporating into a plurality of index files associated with a plurality of letters of the alphabet, a plurality of index links to documentation files for at least two of the plurality of API sets.

24. The method of claim 7, wherein the API sets are configured for use in a Java programming environment, and wherein the navigation file and the index file are created at least in part using a Javadoc documentation generation tool, and wherein each API set includes a plurality of documentation files generated by the Javadoc documentation generation tool.

25. An apparatus, comprising:
(a) at least one processor; and
(b) program code configured to be executed by the at least one processor to organize computer documentation by incorporating into a navigation file a plurality of Application Programming Interface (API) set links associated with a plurality of API sets, and incorporating into an index file a plurality of index links to documentation files for at least two of the plurality of API sets.

26. The apparatus of claim 25, wherein the program code is further configured to display at least a portion of the navigation file in a first display region of a computer display, and to display at least a portion of the index file in a second display region of the computer display.

27. The apparatus of claim 26, wherein the navigation file comprises a first navigation file, wherein the program code is further configured to display in a third display region of the computer display at least a portion of a second navigation file associated with a selected API set among the plurality of API sets, the second navigation file including a plurality of program entity links associated with a plurality of program entities in the selected API set.

28. The apparatus of claim 27, wherein the second navigation file comprises a class navigation file and the plurality of program entity links are associated with a plurality of classes in the selected API set, wherein the program code is further configured to display in a fourth display region of the computer display at least a portion of a package navigation file associated with the selected API set among the plurality of API sets, the package navigation file including a plurality of package links associated a plurality of packages in the selected API set, wherein the class navigation file includes a plurality of program entity links are associated with a plurality of classes in a selected package among the plurality of packages in the selected API set.

29. The apparatus of claim 27, wherein the program code is further configured to, in response to user input to select a program entity link from the second navigation file, display on the computer display at least a portion of a documentation file associated with the selected program entity link.

30. The apparatus of claim 26, wherein the program code is further configured to, in response to user input to select an index link from the index file, display on the computer display at least a portion of a documentation file associated with the selected index link.

31. The apparatus of claim 25, wherein the program code is configured to incorporate the plurality of API set links into the navigation file by, in response to user input to add a new API set, adding a new API set link for the new API set to an existing navigation file including a plurality of existing API set links associated with a plurality of existing API sets.

32. The apparatus of claim 25, wherein the program code is configured to incorporate the plurality of index links into the index file by, in response to user input to add a new API set, merging a plurality of new index links associated with the new API set into an existing index file including a plurality of existing index links associated with a plurality of existing API sets.

33. The apparatus of claim 32, wherein the program code is configured to merge the plurality of new index links with the existing index file by annotating the index file to indicate an association between each new index link and the new API set.

34. The apparatus of claim 32, wherein the plurality of new index links are incorporated into a new index file associated with the new API set, wherein the program code is further configured to, in response to user input to add the new API set, update at least one documentation file associated with the new API set to redirect an index file link disposed therein from the new index file to the existing index file.

35. The apparatus of claim 25, wherein the program code is further configured to, in response to user input to add a new API set, generate at least one use file including a plurality of use links associated with uses of a selected program element, wherein the plurality of use links include links to uses of the selected program element in at least two API sets.

36. The apparatus of claim 25, wherein the program code is further configured to, in response to user input to remove an API set, remove an API set link associated with a removed API set from the navigation file, and remove at least one index link associated with the removed API set from the index file.

37. The apparatus of claim 36, wherein the program code is configured to remove at least one index link from the index file by accessing an annotation in the index file that identifies the removed index link as being associated with the removed API set.

38. The apparatus of claim 25, wherein the program code is further configured to, in response to user input to switch between first and second versions of an API set, comment out a first API set link associated with the first version of the API set from the navigation file, remove commenting in the navigation file for a second API set link associated with the second version of the API set, comment out at least one index link associated with the first version of the API set from the index file, and remove commenting in the index file for at least one index link associated with the second version of the API set.

39. A program product, comprising:
(a) program code configured to organize computer documentation by incorporating into a navigation file a plurality of Application Programming Interface (API) set links associated with a plurality of API sets, and incorporating into an index file a plurality of index links to documentation files for at least two of the plurality of API sets; and
(b) a physical computer readable medium bearing the program code.

40. The program product of claim 39, wherein the physical computer readable medium includes a recordable medium.

* * * * *